US005351890A

United States Patent [19]
Clements

[11] Patent Number: 5,351,890
[45] Date of Patent: Oct. 4, 1994

[54] APPLICATOR HAVING A GLITTER CONTAINER INCLUDING A VENTURI PUMP AND STATIC REDUCING TINSEL

[75] Inventor: Amy K. Clements, Largo, Fla.

[73] Assignee: Graves Spray Supply, Inc., Clearwater, Fla.

[21] Appl. No.: 180,601

[22] Filed: Jan. 13, 1994

[51] Int. Cl.⁵ .................. B05B 7/08; B05B 7/14
[52] U.S. Cl. ........................ 239/143; 239/325; 239/336; 239/527; 222/195; 222/637
[58] Field of Search ............. 239/143, 325, 336, 526, 239/527, 528; 222/135, 189, 195, 630, 637; 406/141, 142, 143

[56] References Cited

U.S. PATENT DOCUMENTS

| | | | |
|---|---|---|---|
| 1,849,945 | 3/1932 | Mobley et al. | 239/143 |
| 3,617,000 | 6/1969 | Probst et al. | 239/143 X |
| 3,777,981 | 12/1983 | Probst et al. | 239/336 X |
| 4,387,852 | 6/1983 | Mattson et al. | 239/143 |
| 4,474,327 | 10/1984 | Mattson et al. | 239/143 |
| 4,553,698 | 11/1985 | Parker et al. | 239/143 X |
| 5,186,388 | 2/1993 | Chapman et al. | 239/143 X |

FOREIGN PATENT DOCUMENTS

| | | | |
|---|---|---|---|
| 341448 | 11/1989 | European Pat. Off. | 222/637 |
| 3611039 | 8/1987 | Fed. Rep. of Germany | 222/637 |
| 2581324 | 11/1986 | France | 239/325 |
| 309981 | 9/1971 | U.S.S.R. | 239/143 |

Primary Examiner—William Grant
Attorney, Agent, or Firm—James E. Larson; Herbert W. Larson

[57] ABSTRACT

An apparatus has a cylindrical container with an intermediate floor containing a multiplicity of air holes through which air is pumped upward to keep glitter within the container above the intermediate floor in movement. A vertical housing within the container contains a venturi jet to suck glitter out of the container, through the vertical housing, and through a hose to a spray gun. Static reducing tinsel is emersed in the glitter in the container and connected to a ground outside the container. The spray gun can separately or simultaneously spray resin and glitter.

15 Claims, 2 Drawing Sheets

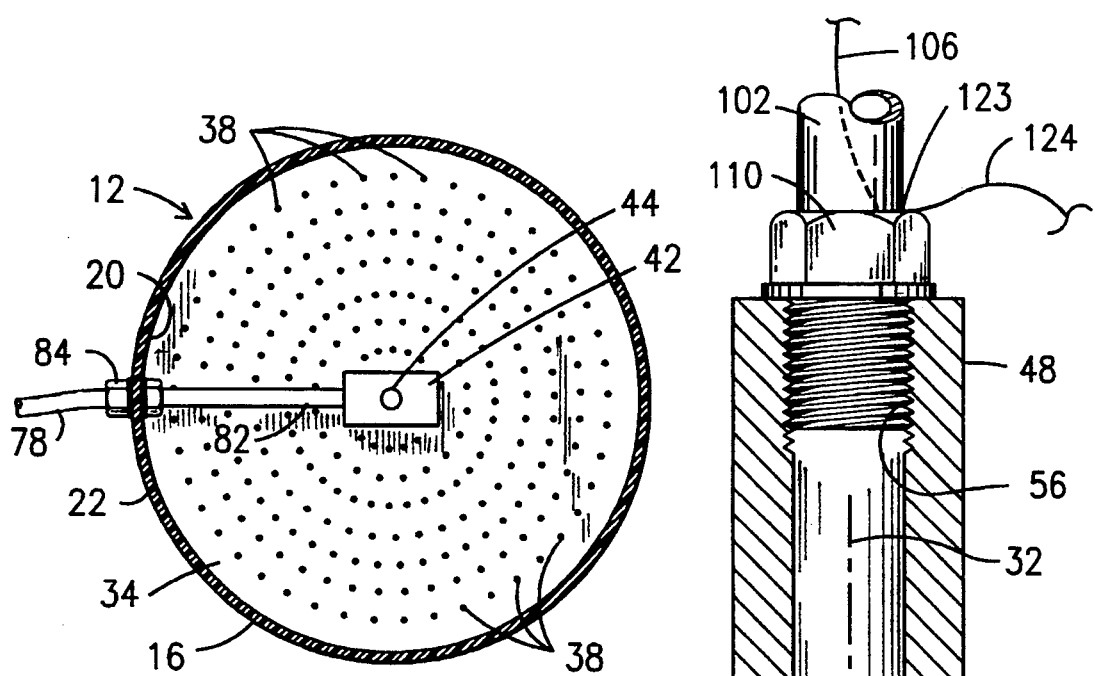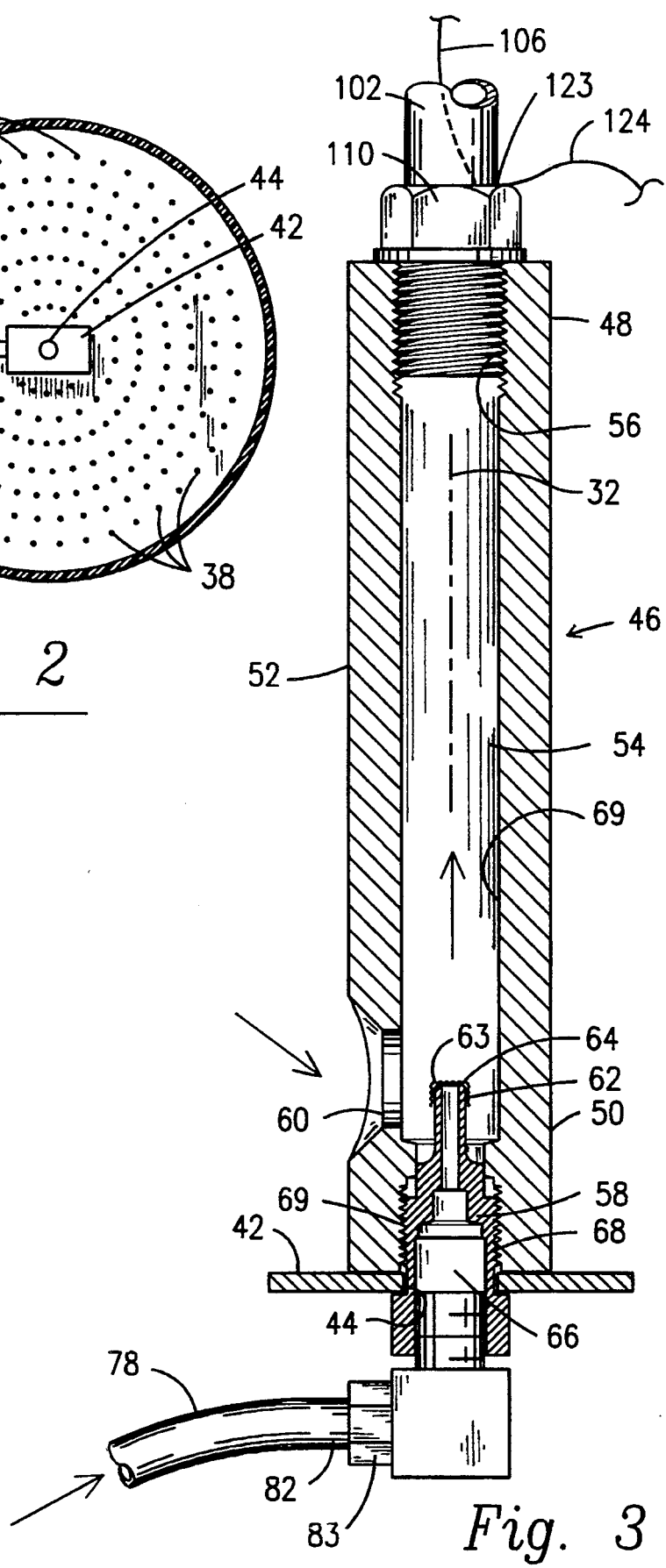

APPLICATOR HAVING A GLITTER CONTAINER INCLUDING A VENTURI PUMP AND STATIC REDUCING TINSEL

BACKGROUND OF THE INVENTION

1. Field of The Invention

This invention relates to an apparatus and a method for spraying lightweight reflective particles in a spray pattern on a surface to impart a visually pleasing appearance. More particularly, it refers to an apparatus and method for applying a glitter coating without excess waste of glitter or excess contamination of the work environment

2. Description of The Prior Art

Prior apparatus and methods for imparting a sparkle appearance to a resin surface have been accomplished by either mixing glitter with resin and then spraying a finishing coat on a formed resin surface, or shooting glitter through an air gun nozzle from a bag. The former method wastes large quantities of glitter by burying it in the resin coating and wastes large quantities of resin from overspraying from the spray gun. The latter method causes large quantities of the glitter to be airborne in the spray area contaminating the air and other equipment in the area. An apparatus and method for applying glitter without waste and without contaminating the work environment is needed.

SUMMARY OF THE INVENTION

I have invented an apparatus and method for controlling the application of glitter to viscous resin surfaces so that waste is limited and the surrounding area is not contaminated with excess glitter or oversprayed resin.

My apparatus and method include a cylindrical container with an intermediate floor having a multiplicity of holes for passage of air. Glitter is poured into the container over the intermediate floor. Air is blown upwards through the holes in the intermediate floor to keep the glitter in suspension. A vertical housing mounted in the middle of the container and supported on the intermediate floor receives air from a hose at a bottom portion of the housing. An opening above the air hose draws in glitter from the container. The glitter moves upward through the vertical housing and exits at a top portion to the first end of a delivery hose. A second end of the delivery hose is attached to a spray gun having a first nozzle for emission of the resin and a second nozzle for emission of glitter. The spray gun operator can simultaneously or alternately spray resin and glitter as needed without excess waste of resin or glitter to the surrounding environment.

BRIEF DESCRIPTION OF THE DRAWINGS

The invention may be best understood by those having ordinary skill in the art by reference to the following detailed description when considered in conjunction with the accompanying drawings in which:

FIG. 2 is a top plan view of an intermediate floor within a cylindrical container used in the invention.

FIG. 3 is as a sectional elevational view of a vertical housing within the cylindrical container.

DETAILED DESCRIPTION OF THE INVENTION

Figure 1:
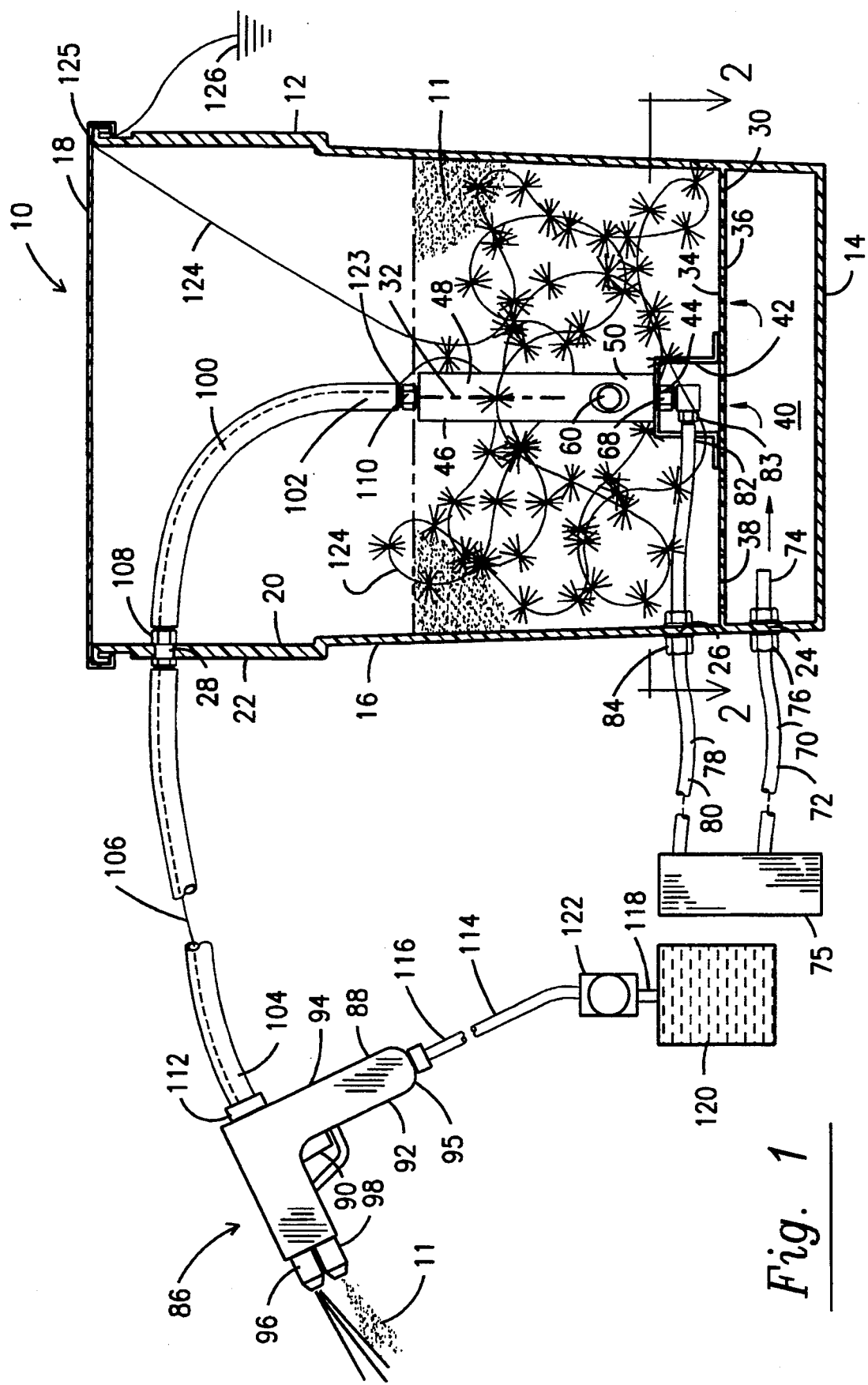
FIG. 1 is a sectional elevational view of the apparatus used in this invention.

Throughout the following detailed description, the same reference numerals refer to the same elements in all figures.

An apparatus 10 of the invention shown in FIG. 1 has a cylindrical container 12 with an integral bottom 14 and sidewall 16. A cover 18 is latched in place over the top of container 12. Container 12 has an inner cylindrical surface 20 and an outer cylindrical surface 22. Sidewall 16 is penetrated by three bores. A first bore 24 is adjacent the bottom of the container 12. Above first bore 24 is second bore 26, and adjacent the top of the container 12 is a third bore 28. Container 12 has an intermediate floor 30 integral with sidewall 16. This intermediate floor 30 has a top surface 34, a bottom surface 36, and a multiplicity of holes 38 formed therein. The holes 38 permit air to flow from an air flow zone 40 to glitter 11 held in the container 12. A bracket 42, having a center opening 44 formed therein, is mounted on the top surface 34 of intermediate floor 30.

As shown in FIG. 1, a vertical housing 46 is mounted on bracket 42 so that a center axis 32 of container 12 is in alignment with the center opening 44 of the bracket 42. Vertical housing 46 has a top portion 48, a bottom portion 50, and a cylindrical sidewall 52 enclosing an internal cavity 54, as shown in FIG. 3. In addition, vertical housing 46 has a threaded first opening 56 formed in top portion 48, a threaded second opening 58 formed in bottom portion 50, and a third opening 60 formed in sidewall 52. A venturi Jet 62 is mounted within vertical housing 46 so that a top end 64 of jet 62 emits air into internal cavity 54. A screen 63 covers top end 64 of venturi jet 62 to prevent glitter 11 from entering venturi jet 62. Bottom 66 of venturi jet 62 is located in bottom portion 50 of vertical housing 46, and a threaded coupling element 68 secures venturi Jet 62 in place in conjunction with bracket 42. Threaded coupling element 68 engages threads in an interior wall 69 of bottom portion 50 of vertical housing 46.

As shogun in FIG. 1, a first hose 70 passes through first bore 24 in sidewall 16 of container 12. A first end 72 of hose 70 is connected to a regulated air pressure generator 75 and a second end 74 of hose 70 is open to air flow zone 40. A coupling element 76 mounts hose 70 in bore 24. Air passes upward from air flow zone 40 through holes 38 in intermediate floor 30 to keep glitter 11 located in container 12 in a constant state of flow over intermediate floor 30.

As shown in FIG. 1, a second hose 78 is mounted through second bore 26 in sidewall 16 of container 12. A first end 80 of hose 78 is connected to a regulated air pressure generator 75. A second end 82 of hose 78 is connected by a coupling element 83 to a connector leading through hole 44 to venturi jet 62. Another coupling element 84 mounts hose 78 in bore 26.

As shown in FIG. 1, a third hose 100 is connected by a coupling element 110, at a first end 102 of third hose 100, to top portion 48 of housing 46. As shown in FIG. 3, threaded first opening 56 in housing 46 engages the threads of the coupling element 110. As shown in FIG. 1, a second hose end 104 is connected by coupling elements 112 to a spray gun 86. The spray gun has a handle 88, a trigger 90, a first nozzle 96 for emission of resin, and a second nozzle 98 for emission of glitter 11.

As shown in FIG. 1, third hose 100 is mounted through third bore 28 of housing sidewall 16 by a coupling element 108. A ground wire portion 106 is located in hose 100 between top portion 48 of housing 46 and a back 94 of spray gun 86. Ground wire 106 is attached to a static reducing tinsel 124 at a first end 123 of tinsel 124 at top portion 48 of housing 46. Static reducing tinsel 124 is emersed in glitter 11 in container 12 and connected at a second end 125 of tinsel 124 to a ground 126 outside the container 12.

As shown in FIG. 1, a fourth hose 114 delivers a resin from a resin source 120. A first end 118 of hose 114 is connected to resin source 120 and a second end 116 of hose 114 is connected to a bottom portion 95 of handle 88. The resin exits the spray gun at first nozzle 96. A pump 122 for moving the resin is inserted in line with hose 114.

Glitter 11 can be a reflective metallized flake material or a color coated plastic flake material commonly used in the art to impart a sparkle to a surface. The apparatus 10 permits spraying of resin and glitter 11 together or spraying resin first to create a tacky viscous surface for glitter 11 to adhere. Both methods produce a sparkled reflective surface. The apparatus 10 described herein, permits conservation of glitter 11 and resin, and prevents blowing of glitter 11 and resin into the work environment, thereby limiting the contamination of the work environment.

In the method of the invention, glitter 11 is dumped into container 12 and lid 18 is snapped in place. Thereafter air is allowed to flow through first hose 70 into air flow zone 40, through holes 38, to keep glitter 11 moving. When the spray operation is begun, additional air is injected through second hose 78 and through venturi jet 62, thereby causing glitter 11 to be sucked through hole 60 up through vertical housing 46 and through third hose 100 to the spray gun 86. Ground wire portion 106 and static reducing tinsel 124 prevent static from developing in the glitter 11. First nozzle 96 sprays resin and second nozzle 98 sprays glitter 11. The spray gun 86 permits separate spraying of the resin and glitter 11 or simultaneous spraying of the resin and glitter 11.

Equivalent elements can be substituted for the elements employed in this invention in order to carry out the method in the same way to create the same result.

Having thus described the invention what is claimed and desired to be secured by Letters Patent is:

1. An apparatus for applying glitter on a surface, the apparatus comprising,
    a container having a planar bottom member, a planar intermediate floor member with a multiplicity of air holes formed therein, and an air flow zone between the bottom member and the intermediate floor member for receiving a flow of air,
    the glitter to be applied being located above the intermediate floor member and kept within the container by a lid,
    a vertical housing mounted on the intermediate floor member, a bottom portion of the vertical housing containing an internally mounted venturi Jet, and a hole formed in a sidewall of the vertical housing for drawing glitter into the vertical housing when air is pumped through the venturi jet from the bottom portion of the vertical housing,
    a static reducing tinsel located within an area containing glitter and connected to a grounding means outside the container to prevent static buildup, and
    means for connecting the vertical housing to a spray gun to permit flow of glitter when the spray gun is activated.

2. The apparatus for applying glitter on a surface according to claim 1, further including means for supplying air to the air flow zone, such that the glitter is in a fluidized state when air flows from the air flow zone to the portion of the container holding the glitter.

3. The apparatus for applying glitter on a surface according to claim 1, wherein the venturi jet is mounted below the uppermost level of the glitter in the fluidized state.

4. The apparatus for applying glitter on a surface according to claim 1, wherein the surface is dry.

5. The apparatus for applying glitter on a surface according to claim 1, wherein the surface is viscous.

6. An apparatus for applying glitter on a surface, the apparatus comprising,
    a container having a planar bottom member, a cylindrical side member integral with the planar bottom member, a removable cover, and a center axis, the cylindrical side men, bet having an inner and outer surface and a first, second, and third bore formed therein, the container holding the glitter to be applied,
    a planar intermediate floor member having a top and bottom surface and a multiplicity of holes formed therein, the floor member being integrally molded to the inner surface of the cylindrical side men%-bet of the container above the bottom member, the floor member and bottom member defining an air flow zone, the holes formed in the floor member permitting air to travel from the air flow zone to the portion of the container holding the glitter to be applied,
    a bracket having a center opening formed therein and mounted to the top surface of the intermediate floor member such that the center opening is axially aligned with the center axis of the container,
    a vertical housing having a top and bottom portion, a cylindrical sidewall, an internal cavity, a threaded first opening formed in the top portion, a threaded second opening formed in the bottom portion, and a third opening formed in the cylindrical sidewall, the bottom portion of the vertical housing mounted to the bracket such that the threaded second opening of vertical housing is axially aligned with the center opening of the bracket and the center axis of the container
    a venturi Jet having a top and bottom end, the venturi Jet inserted into the threaded second opening of the vertical housing and secured by a threaded coupling element engaging the threaded second opening, the top end of the venturi jet enclosed within the internal cavity of the vertical housing and covered by a screen,
    a flexible first hose having first and second ends, the first hose inserted through the first bore of the container and secured by a coupling element, the second end of the first hose enclosed within the air flow zone, the first end of the first hose connected to an air generator,
    a flexible second hose having first and second ends, the second hose inserted through the second bore of the container and secured by a coupling element, the second end of the second hose connected to the bottom end of the venturi jet, the first end of the second hose connected to the air generator,
    a spray gun having a handle, a trigger, a first nozzle, and a second nozzle, the handle having a bottom portion and a back portion, a flexible third hose having first and second ends and enclosing a ground wire, the third hose inserted through the third bore of the container and secured by a coupling element, the second end of the third hose connected to the threaded first opening of the vertical housing and held in place by a threaded coupling element engaging the threaded first opening, the first end of the third hose connected to the back portion of the handle of the spray gun and secured by a coupling element, the third hose transporting the glitter from the container to the spray gun, a static reducing tinsel having first and second ends and emersed in the glitter the first end of the tinsel attached to the ground wire at the top portion of the vertical housing, and the second end of the tinsel attached to a ground means located outside the container, a flexible fourth hose having first and second ends, the second end of the fourth hose connected to the bottom portion of the handle of the spray gun, the first end of the fourth hose connected to a resin source, and means for transporting resin from the resin source to the spray gun.

7. The apparatus for applying glitter on a surface according to claim 6, wherein the glitter is a reflective metal flake.

8. The apparatus for applying glitter on a surface according to claim 6, wherein the glitter is a reflective plastic flake.

9. The apparatus for applying glitter on a surface according to claim 6, wherein the resin source is a bucket containing resin.

10. The apparatus for applying glitter on a surface according to claim 9, wherein the means for transporting resin from the resin source to the spray gun is a pump attached along the fourth hose, intermediate the spray gun and the bucket containing resin.

11. The apparatus for applying glitter on a surface according to claim 6, wherein the first and second nozzles of the spray gun permit separate spraying of the resin and glitter into the air.

12. The apparatus for applying glitter on a surface according to claim 6, wherein the first and second nozzles of the spray gun permit simultaneous spraying of the resin and glitter into the air.

13. An apparatus for applying glitter on a surface, the apparatus comprising, a container having a planar bottom member, a cylindrical side member integral with the planar bottom member, a removable cover, and a center axis, the cylindrical side member having an inner and outer surface and a first, second, and third bore formed therein, the container holding the glitter to be applied, a planar intermediate floor member having a top and bottom surface and a multiplicity of holes formed therein, the intermediate floor member being integrally molded to the inner surface of the cylindrical side member above the bottom member, the intermediate floor member and the bottom member defining an air flow zone, the holes formed in the intermediate floor member permitting air to travel from the air flow zone to the portion of the container holding the glitter to be applied, a bracket having a center opening formed therein and mounted to the top surface of the intermediate floor member such that the center opening is axially aligned with the center axis of the container, a vertical housing having a top and bottom portion, a cylindrical sidewall, an internal cavity, a threaded first opening formed in the top portion, a threaded second opening formed in the bottom portion, and a third opening formed in the cylindrical sidewall, the bottom portion of the vertical housing mounted to the bracket such that the threaded second opening of vertical housing is axially aligned with the center opening of the bracket and the center axis of the container, a venturi jet having a top and bottom end, the venturi jet inserted into the threaded second opening of the vertical housing and secured by a threaded coupling element engaging the threaded second opening, the top end of the venturi jet enclosed within the internal cavity of the vertical housing below the uppermost level of the glitter, the top end of the venturi jet covered by a screen to prevent glitter from entering the top end of the venturi jet, a flexible first hose having first and second ends, the first hose inserted through the first bore of the container and secured by a coupling element, the second end of the first hose enclosed within the air flow zone, the first end of the first hose connected to an air generator, the first hose delivering compressed air from the air generator to the container, the compressed air fluidizing the glitter, a flexible second hose having first and second ends, the second hose inserted through the second bore of the container and secured by a coupling element, the second end of the second hose connected to the bottom end of the venturi jet, the first end of the second hose connected to the air generator, the second hose delivering compressed air from the air generator to the internal cavity of the vertical housing through the venturi jet drawing the glitter from the container into the internal cavity of the vertical housing.

a spray gun having a handle, a trigger, a first nozzle, and a second nozzle, the handle having a bottom portion and a back portion, a flexible third hose having first and second ends and enclosing a ground wire, the third hose inserted through the third bore of the container and secured by a coupling element, the second end of the third hose connected to the threaded first opening of the vertical housing and held in place by a threaded coupling element engaging the threaded first opening, the first end of the third hose connected to the back portion of the handle of the spray gun and secured by a coupling element, the third hose transporting the glitter from the container to the spray gun, the ground wire rendering any charge in the glitter in the third hose, a static reducing tinsel having first and second ends and emersed in the glitter in the container, the first end of the tinsel attached to the ground wire at the top portion of the vertical housing, and the second end of the tinsel attached to a ground located outside the container, a flexible fourth hose having first and second ends, the second end of the fourth hose connected to the bottom portion of the handle of the spray gun, the first end of the fourth hose connected to a bucket containing resin, the fourth hose delivering resin from the bucket to the spray gun, and a pump attached along the fourth hose, intermediate the spray gun and the bucket containing resin.

14. The apparatus for applying glitter to a surface according to claim 13, wherein the first and second nozzles of the spray gun permit separate spraying of the resin and glitter into the air.

15. The apparatus for applying glitter to a surface according to claim 13, wherein the first and second nozzles of the spray gun permit simultaneous spraying of the resin and glitter into the air.

* * * * *